March 1, 1949.　　　O. M. GROSS　　　2,462,956

CULINARY UTENSIL

Filed March 6, 1945

INVENTOR.
OPAL. M. GROSS.

BY *[signature]*

ATTORNEY.

Patented Mar. 1, 1949

2,462,956

UNITED STATES PATENT OFFICE 2,462,956

CULINARY UTENSIL

Opal M. Gross, Denver, Colo.

Application March 6, 1945, Serial No. 581,246

2 Claims. (Cl. 220—23.4)

This invention relates to culinary arts and practices, and more particularly to certain of the utensils employed therein, and has as an object to provide an improved arrangement and assembly of elements constituting a culinary utensil of wide utility and enhanced convenience.

A further object of the invention is to provide a conveniently separable assembly of elements constituting a gem or muffin pan adaptable to a variety of specific culinary uses.

A further object of the invention is to provide an improved construction and arrangement of elements cooperable to comprise a unitary baking utensil wherefrom the individual container elements may be conveniently separated.

A further object of the invention is to provide an improved construction and arrangement of container elements and rack conveniently and selectively interengageable to form a unitary culinary utensil assembly.

A further object of the invention is to provide an improved construction and arrangement of elements selectively interengageable to separably interconnect individual containers with a rack in a unitary utensil assembly.

A further object of the invention is to provide an improved separable gem or muffin pan that is simple and inexpensive of manufacture, widely adaptable and convenient in use, readily adjustable to the specific needs of a given culinary operation, easy to clean, and susceptible of production from a variety of materials in various specific forms, sizes and combinations.

My invention consists in the construction, arrangement, and combination of elements hereinafter set forth, pointed out in my claims, and illustrated by the accompanying drawing, in which—

Figure 1:
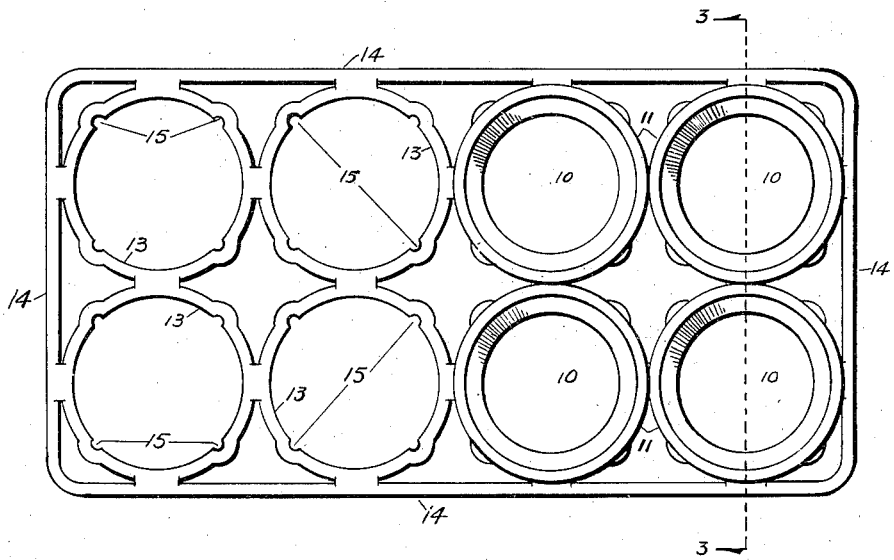
Figure 2:
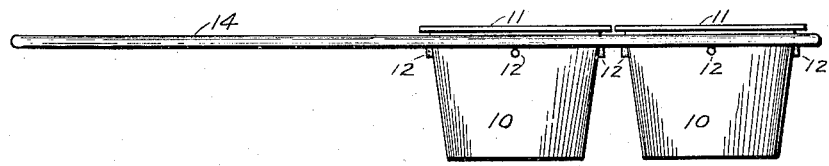
Figure 3:
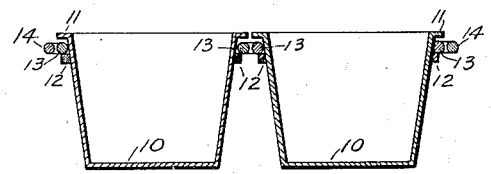

Figure 1 is a plan view, partially assembled, of one embodiment of the invention as constructed and arranged for practical use. Figure 2 is a side elevation of the showing of Figure 1. Figure 3 is a cross section taken on the indicated line 3—3 of Figure 1.

Muffin or gem pans comprised of a plurality of frusto-conical cups or containers juxtaposed in various combinations and arrangements and variously interconnected, usually permanently, as a unitary assembly are ancient and useful components of conventional kitchen equipment. The convenience and utility of conventional muffin pans are restricted by their unitary construction which requires use of the complete assembly when actually a less number of cups or containers would serve; which precludes use of the individual cups or containers for moulding, storage, handling and serving of food; and which aggravates cleaning of the used utensil. It is to obviate, or at least minimize, the foregoing disadvantages of conventional construction and to enlarge the utility of the utensil while preserving all of the functions and advantages heretofore inherent therein, that the instant invention has been devised.

In the construction of the improvement as shown, the numeral 10 designates a typical gem or muffin pan cup formed to convenient or conventional size and frusto-conical shape in any suitable or desired manner from material, such as metal, glass, and the like, having the degree of rigidity and heat resistance requisite to its purpose. Conforming with usual practice, the cups 10 of the invention are alike in size and shape in a given assembly, are closed at their lesser ends, open at their greater ends, and, to give effect to the concept of the invention, are formed as separate, independent units, preferably reenforced or stiffened by means of a bead or annular flange 11 surrounding their open ends, in such number as may be comprised within a given unitary assembly. Whatever be its specific manner, form, or material of construction, each of the cups 10 is provided with a like number, four in the illustrated example, of ears or lugs 12 uniformly spaced circumferentially of and about the exterior conical cup wall to project radially therefrom in a uniform spacing axially of the cup from and beneath the bead or flange 11 thereof. The ears or lugs 12 may be of material the same as or different from that of the associated cup 10 and may be formed integrally with or suitably fixed to said cup, as may be deemed most expedient or desirable.

To complete a muffin or gem pan unit, the independent cups 10 are engaged with and to a rigid rack arranged to accommodate a given maximum number of said cups in the manner illustrated by the drawing and hereinafter described. The rack may vary considerably in the specific details and manner of its construction without impairment of its functions, and may be fabricated, assembled, moulded, or stamped from any material having suitable rigidity and heat resistance characteristics. As shown in the drawing, the rack consists of eight identical, rigid, modified rings 13 marginally juxtaposed and rigidly interconnected in coplanar relation to form a symmetrical rectangular pattern, and a loop frame 14 coplanar with, embracingly about, and rigidly secured to the assembly of rings 13.

Each of the rings 13 defines a circular aperture of a size to telescopically receive a cup 10 and engage with and about the cup exterior surface between the cup flange 11 and lugs or ears 12, thus providing for an extension of the cup open end somewhat beyond the plane of the associated ring when the cup is fully seated therein, and to permit such full seating of the cup each ring 13 is formed with a plurality of radially outward offsets 15, corresponding in number and circumferential spacing with the number and spacing of the cup lugs or ears 12, so sized and contoured as to accommodate and to permit passage through the ring of the said lugs or ears projecting from the associated cup. The disposition of the lugs or ears 12 axially of the cup 10 is such as to bring them immediately adjacent the side of the ring 13 remote from the flanged end of the cup when the latter is fully seated in the ring and hence into position to engage with and bear against said adjacent ring side and hold the cup against displacement axially relative to the ring when the seated cup is rotated sufficiently to move its lugs or ears 12 out of registration with the ring offsets 15, thereby firmly, but removably, clamping the cup to its ring 13 and the rack whereof said ring is an element. The rings 13 and loop frame 14 may be interconnected as a rigid unit by soldering, welding, brazing, or otherwise permanently joining their points of contact, as is indicated in Figure 1, to form an open or skeleton rack, and said rack is preferably a flat unit free from projecting legs, or the like, which is wholly supported in operative position by the cups 10 therein engaged.

As will be apparent, the improved construction provides for independent use of the individual cups 10 for any desired purpose; for association and separation of the cups 10 relative to the rack in such variation of number and combination as will meet the needs of a given culinary operation and facilitate conditioning, storage, and serving of foods contained therein; and for convenience and efficiency in the cleansing and storage of the elements constituting the assembly. When associated with their rack, the cups 10 meet all of the requirements and accomplish all of the functions of conventional muffin or gem pans and are available, when the assembly is inverted, for the baking of pastry cups or shells from batter enveloped over their exterior bases and adjacent conical surfaces.

Since many changes, variations, and modifications in the specific form, construction, and arrangement of the elements shown and described may be had without departing from the spirit of the invention evidenced by the combination presented, I wish to be understood as being limited solely by the scope of the appended claims, rather than by any details of the illustrative showing and foregoing description.

I claim as my invention—

1. In a culinary utensil of the character described, a plurality of like, rigid rings of initially cylindrical material each formed with a plurality of radially outward offsets interrupting its inner margin tangentially contacting and interbonded in a coplanar assembly, a closed, rigid loop of initially cylindrical material embracingly about the ring assembly, and means interconnecting between and rigidly uniting adjacent, tagentially-contacting points of said rings and loop; together with frusto-conical cups removably and replaceably engageable within said rings and lugs exteriorly of said cups cooperable with said ring offsets to clampably interrelate a cup and ring.

2. In a culinary utensil of the character described having a plurality of separate, identical, frusto-conical cups, means for the selective association of said cups in desired number as a unit assembly, said means comprising a plurality of like, rigid rings of initially cylindrical material sized to telescopically receive and seat a cup and each formed with a plurality of radially outward offsets, bonds rigidly interconnecting adjacent, tangentially-contacting points of said rings to form a coplanar, juxtaposed assembly, a closed, rigid loop of initially cylindrical material embracingly about the ring assembly, and bonds rigidly interconnecting adjacent, tangentially-contacting points of said rings and loop; together with lugs exteriorly of said cups cooperable with said ring offsets to clampably interrelate a cup and ring.

OPAL M. GROSS.

REFERENCES CITED

The following references are of record in the file of this patent:

UNITED STATES PATENTS

| Number | Name | Date |
|---|---|---|
| 586,195 | Monroe | July 13, 1897 |
| 924,209 | Wolfer | June 8, 1909 |
| 1,283,482 | Durkee | Nov. 5, 1918 |
| 1,622,075 | Atwater | Mar. 22, 1927 |
| 1,740,999 | Prabell | Dec. 24, 1929 |

FOREIGN PATENTS

| Number | Country | Date |
|---|---|---|
| 19,331 | The Netherlands | Nov. 17, 1928 |